(12) United States Patent
Janelle et al.

(10) Patent No.: US 10,842,063 B2
(45) Date of Patent: Nov. 24, 2020

(54) TILLAGE MACHINE AND TILLAGE DISK FOR THE SAME

(71) Applicant: Deere & Company, Moline, IL (US)

(72) Inventors: Luc Janelle, Ankeny, IA (US); David L. Steinlage, Centralia, KS (US); Jacob W. Cross, Norwalk, IA (US); Greg T. Buse, Johnston, IA (US); Rohit Bartakke, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/891,134

(22) Filed: Feb. 7, 2018

(65) Prior Publication Data

US 2019/0239412 A1   Aug. 8, 2019

(51) Int. Cl.
*A01B 15/16*   (2006.01)

(52) U.S. Cl.
CPC .................................. *A01B 15/16* (2013.01)

(58) Field of Classification Search
CPC ......... A01B 15/16; A01B 15/18; A01B 23/06; A01B 71/04
See application file for complete search history.

(56) References Cited

U.S. PATENT DOCUMENTS

| 2,406,553 | A | * | 8/1946 | Mader | A01B 23/06 172/599 |
| 3,005,501 | A | * | 10/1961 | Frank | A01B 21/08 172/599 |
| 4,607,706 | A | * | 8/1986 | Raynor | A01C 5/064 172/535 |
| 2014/0299343 | A1 | | 10/2014 | Bruce | |
| 2015/0034344 | A1 | * | 2/2015 | Bruce | B24B 3/466 172/604 |

OTHER PUBLICATIONS

John Deere, "2620, 2623, 2625 Disk, 2623VT (N.A. Edition) (S.N. 745101-)," <http://manuals.deere.com/omview/OMN400370_19/?tM=HO> webpage accessed Oct. 10, 2018.

* cited by examiner

*Primary Examiner* — Thomas B Will
*Assistant Examiner* — Joel F. Mitchell
(74) *Attorney, Agent, or Firm* — Michael Best & Friedrich LLP (57) ABSTRACT

A disk for use with a tillage machine includes a body portion rotatable about an axis of rotation. The body portion has a circumferential edge and a concavity with a first radius defined from a point on the axis of rotation. A hub portion is continuous with the body portion and presents an abutment face having a concavity with a second radius defined from a point on the axis of rotation. An aperture extends through the abutment face and is centered about the axis of rotation.

15 Claims, 7 Drawing Sheets

TILLAGE MACHINE AND TILLAGE DISK FOR THE SAME

BACKGROUND

The present disclosure relates to tillage machines and specifically to a tillage disk or blade for use with tillage machines.

Tillage machines commonly include a gang having a gang support element (e.g., elongate tube, arm, frame member, etc.) and a set of blades or disks rotatably coupled to the gang support element and aligned parallel to one another along a common axis of rotation. The blades dig into soil as the gang is being pulled behind a tractor or other vehicle to improve the condition of the soil for planting.

SUMMARY

A disk for use with a tillage machine includes a body portion rotatable about an axis of rotation. The body portion has a circumferential edge and a concavity with a first radius defined from a point on the axis of rotation. A hub portion is continuous with the body portion and presents an abutment face having a concavity with a second radius defined from a point on the axis of rotation. An aperture extends through the abutment face and is centered about the axis of rotation.

A disk assembly for use with a tillage machine includes a disk having a body portion rotatable about an axis of rotation. The body portion has a circumferential edge and a concavity with a first radius defined from a point on the axis of rotation. A hub portion is continuous with the body portion and presents a first abutment face having a concavity with a second radius defined from a point on the axis of rotation and a second abutment face opposing the first abutment face. An aperture extends through the first and second abutment faces and is centered about the axis of rotation. A first spool is positionable against the first abutment face and includes a bore alignable with the aperture along the axis of rotation. A second spool is positionable against the second abutment face and includes a bore alignable with the aperture along the axis of the rotation. The disk, the first spool, and the second spool are configured to be positioned along a gang bolt that extends along the axis of rotation.

A disk for use with a tillage machine includes a body portion rotatable about an axis of rotation. The body portion has an outer edge and a concavity. A hub portion is continuous with the body portion and presents a curvilinear abutment face. An aperture extends through the abutment face and is centered about the axis of rotation.

A tillage disk assembly kit includes a first disk having a body portion rotatable about an axis of rotation. The body portion has a circumferential edge and a concavity with a first radius defined from a point on the axis of rotation. A hub portion is continuous with the body portion and presents a first abutment face having a concavity with a second radius defined from a point on the axis of rotation and a second abutment face opposing the first abutment face. The kit also includes a second disk having a body portion rotatable about an axis of rotation. The body portion has a circumferential edge and a concavity with a third radius defined from a point on the axis of rotation. The third radius is different than the first radius. A hub portion is continuous with the body portion and presents a third abutment face having a concavity with the second radius and a fourth abutment face opposing the third abutment face. The kit includes a first spool positionable against the first abutment face and positionable against the third abutment face. The kit further includes a second spool positionable against the second abutment face and positionable against the fourth abutment face. The first disk, the first spool, and the second spool are configured to be positioned along a gang bolt that extends along the axis of rotation for tillage operation. The second disk, the first spool, and the second spool are configured to be positioned along the gang bolt for tillage operation.

DETAILED DESCRIPTION

Before implementations of the disclosure are explained in detail, it is to be understood that the disclosure is not limited in its application to the details of construction and the arrangement of components set forth in the following description or illustrated in the accompanying drawings. The disclosure is capable of supporting other implementations and of being practiced or of being carried out in various ways.

Figure 1:
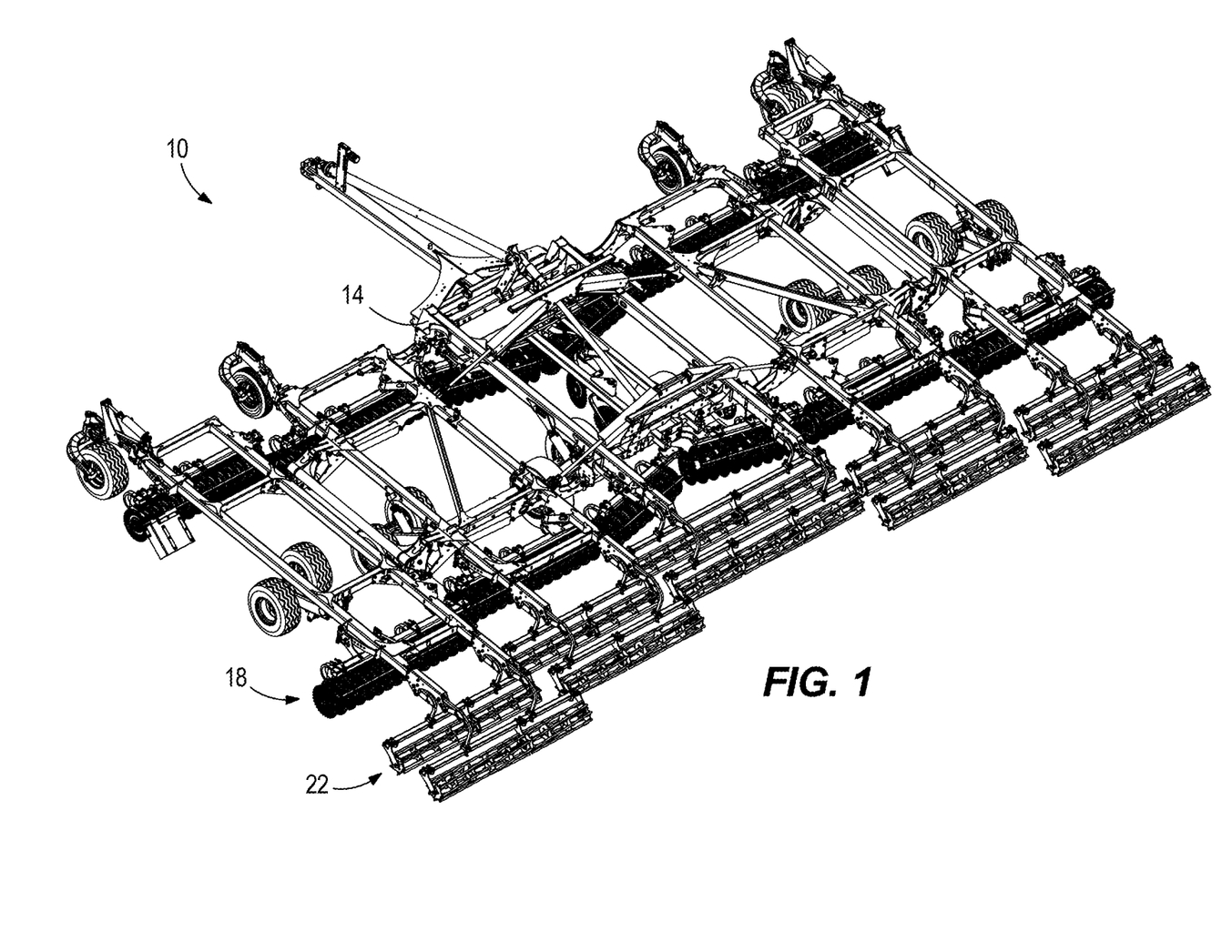
FIG. 1 is a perspective view of a tillage machine including a gang and a set of tillage disks or blades coupled to the gang.

FIG. 1 illustrates a tillage machine 10. The tillage machine 10 includes a main frame 14 and a gang 18 coupled to the main frame 14. The gang 18 includes a gang support element 22 (e.g., elongate tube, arm, frame member, etc.) and a plurality of tillage disks or blades coupled thereto.

Figure 2A:
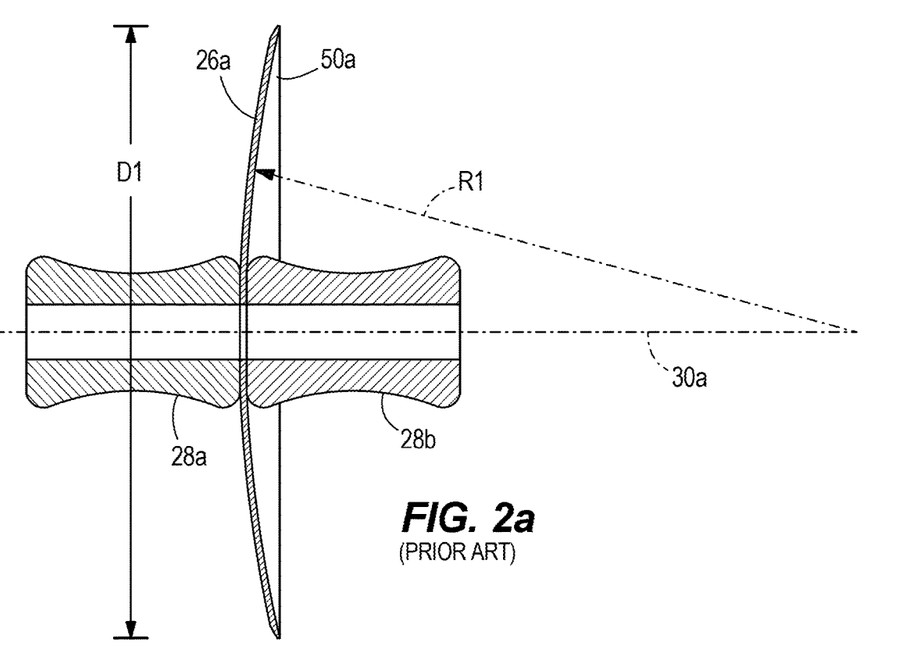
FIG. 2a is a perspective cross-sectional view through a prior art tillage disk.
Figure 2B:
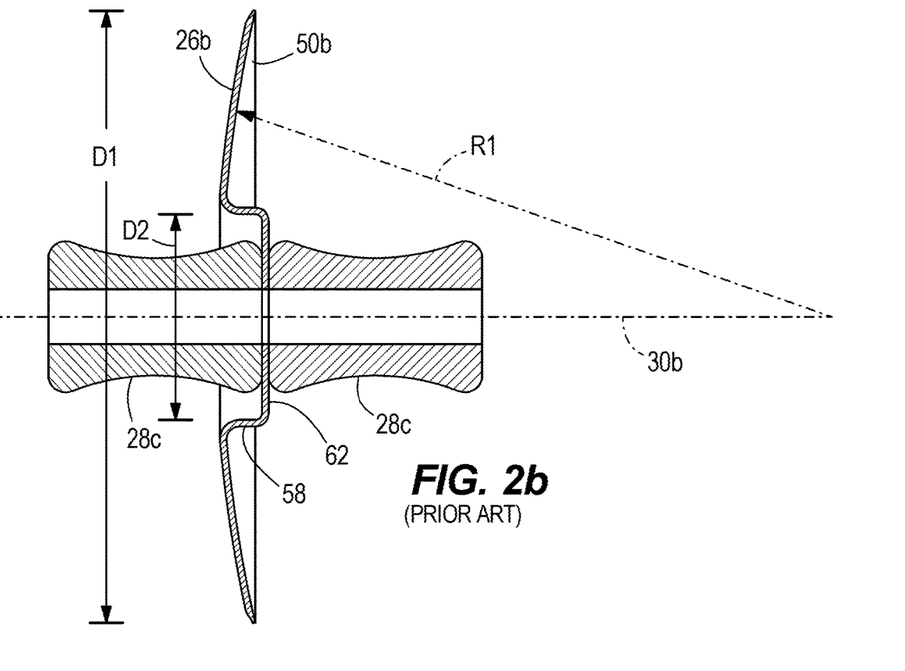
FIG. 2b is a perspective cross-sectional view through another prior art tillage disk.
Figure 3:
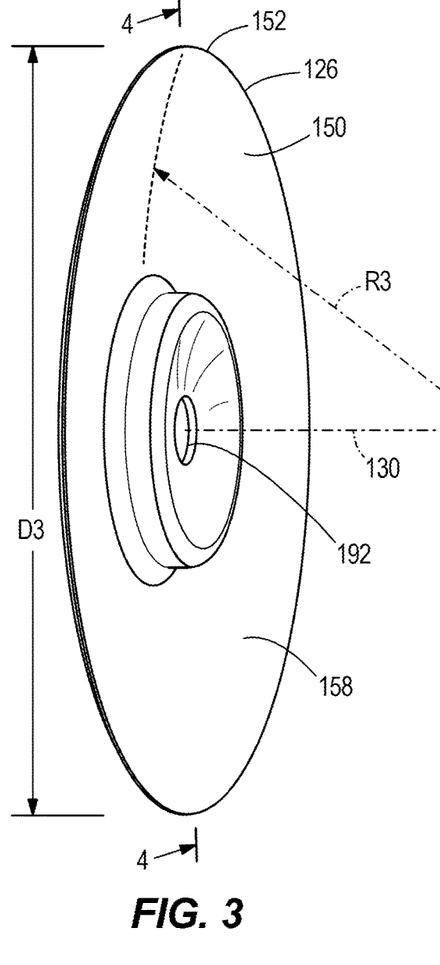
FIG. 3 is a perspective view of a tillage disk according to a one implementation.
Figure 4:
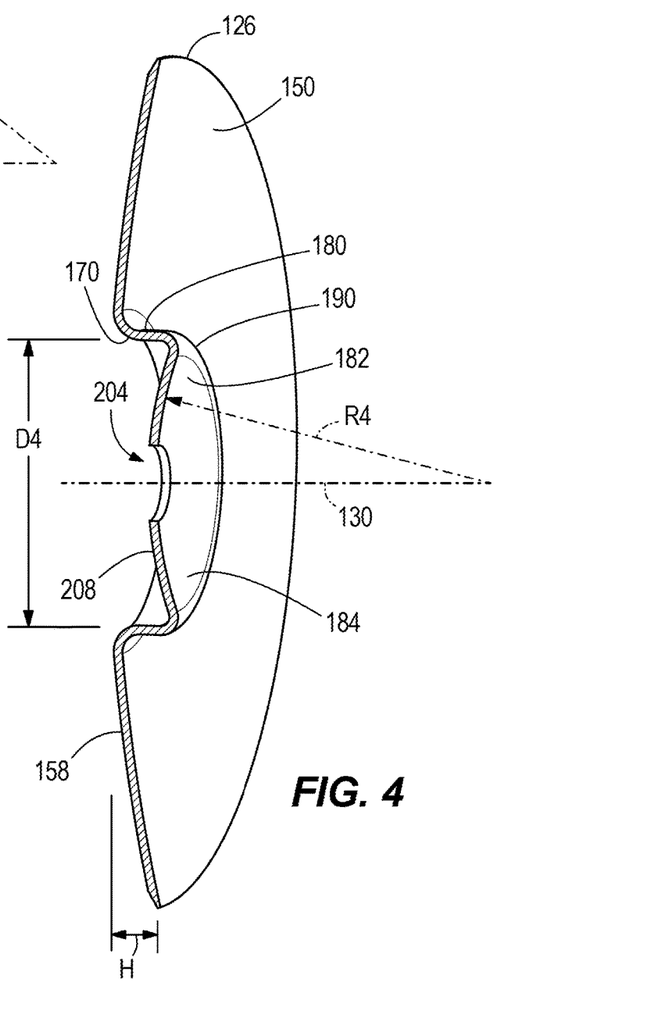
FIG. 4 is a perspective cross-sectional view of the disk of FIG. 3.
Figures 5, 6:
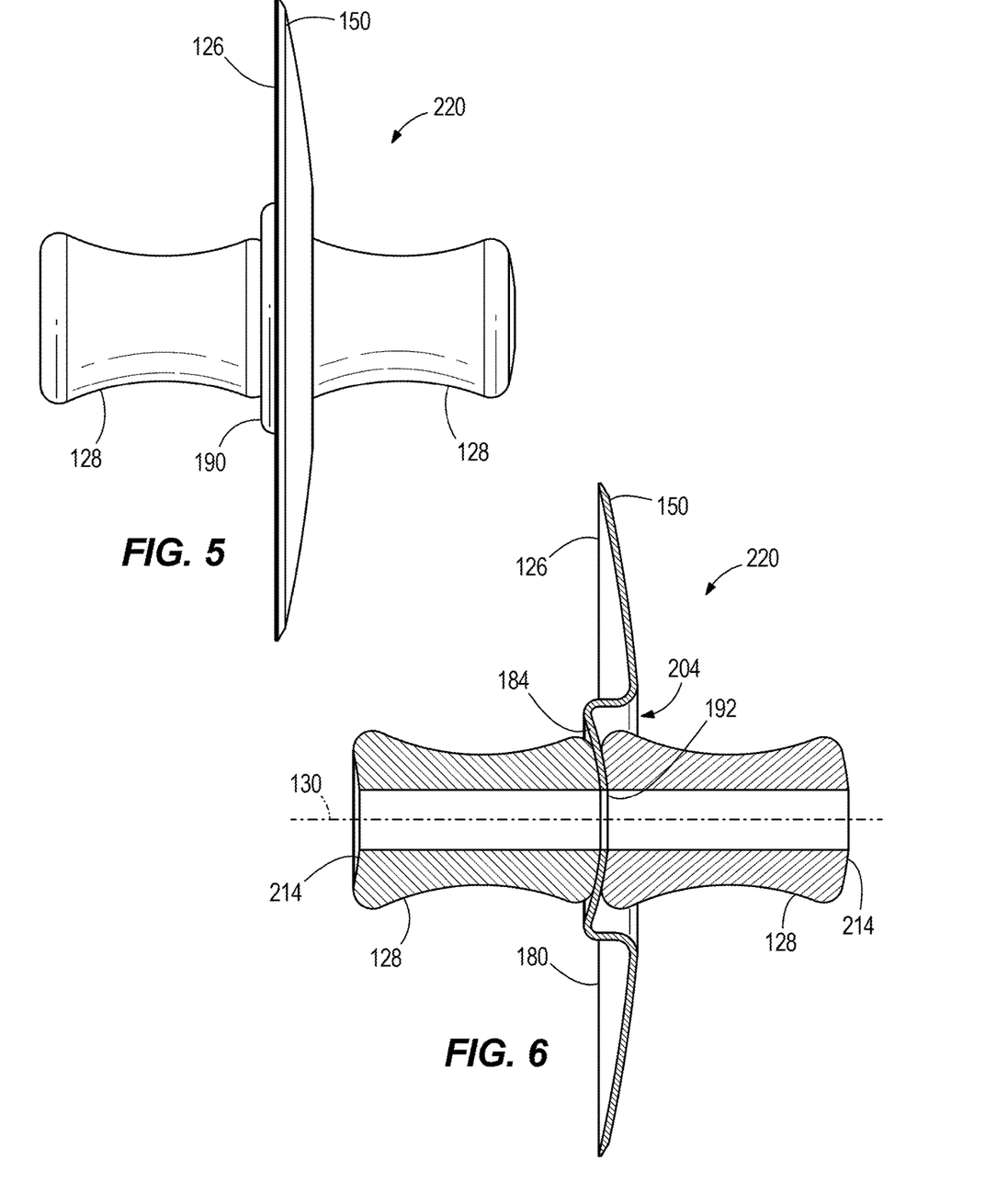
FIG. 5 is a side view of the disk of FIG. 3 adjacent first and second spools.
FIG. 6 is a cross-sectional view of the disk and spools of FIG. 5.
Figure 7:
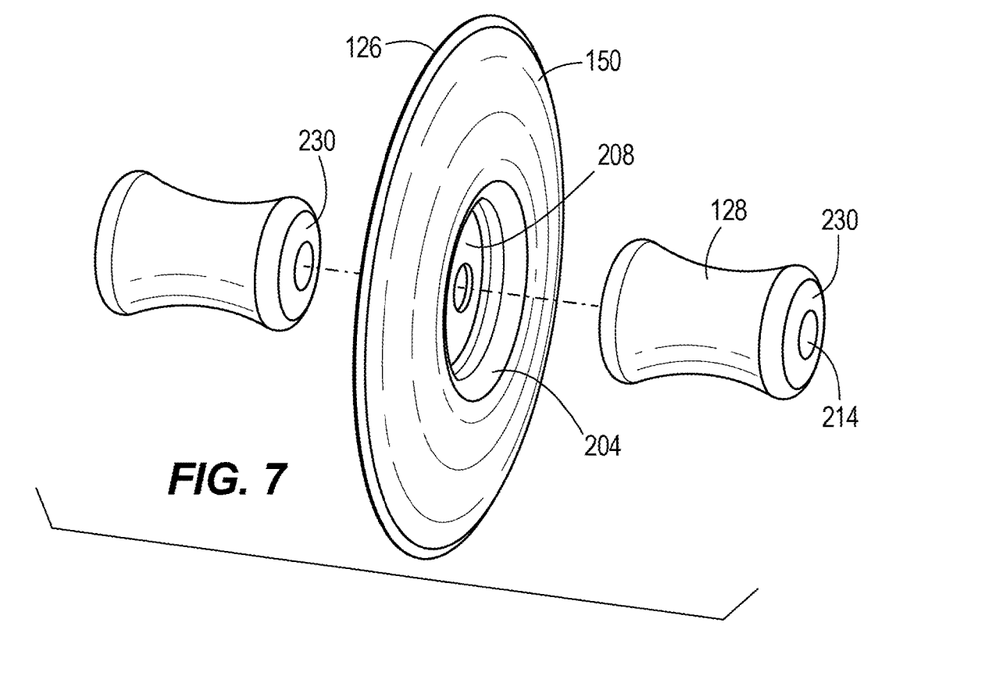
FIG. 7 is an exploded view of the disk and spools of FIG. 5.
Figure 8:
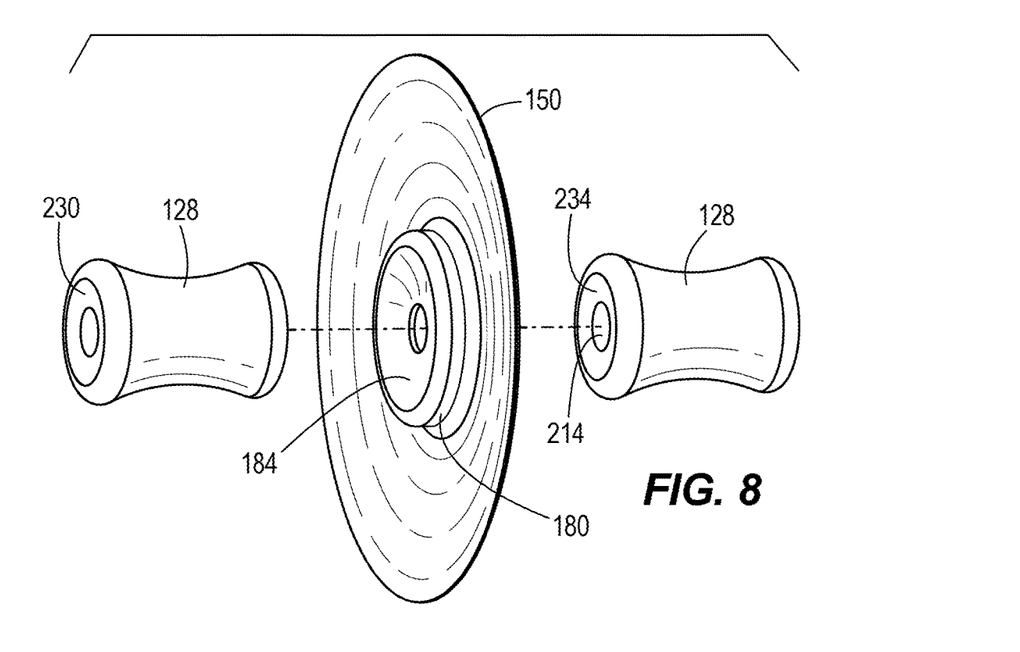
FIG. 8 is another exploded view of the disk and spools of FIG. 5.

FIGS. 2a and 2b each illustrate prior art disks or blades (26a, 26b) that may be coupled to the gang support element 22 of FIG. 1 and separated by spools or disk spacers 28a, 28b, and 28c, respectively. With respect to FIGS. 2a and 2b, the disks 26a, 26b each rotate about a common axis of rotation 30a, 30b (when operational).

As shown in FIG. 2a, the disk 26a has a body 50a with a uniform radial concavity having a radius R1 measured from a point on the axis 30a across the entirety of the disk diameter D1. The disc concavity is further constant about the axis of rotation 30a. Alternatively, as shown in FIG. 2b, the disk 26b has a body 50b and a central hub 58. Disk 26b has a radial concavity having a radius R1 measured from a point on the axis 30b across the body 50b and about the axis of rotation 30b, but R1 is discontinuous across diameter D1 due to the presence of the hub 58. The hub 58 defines a flat wall 62 having a diameter D2. Conventionally, a user will switch out the disks 26a, 26b on the tillage machine to change the concavity (i.e., the radius such as R1) of the body 50a, 50b to therefore provide different tillage effects on the soil. With respect to FIG. 2a, for example, if the replacement disks 26a have a different degree of concavity than the original disks, the user also has to change the spools 28a, 28b, respectively to ensure the mating surfaces between spool and disk sufficiently match the new concavity. In other words, the spools 28 are not universal among all disks 26.

FIGS. 3-8 illustrate a disk 126. The disk 126 defines an axis of rotation 130 (FIG. 6) and includes a body 150 with a diameter D3 across an outer or circumferential edge 152 and having a non-infinite (i.e., non-flat) radial concavity having a radius R3 measured from a point on the axis 130, which is also constant about the axis of rotation 130. In some implementations, the body 150 can therefore be described as in the form of a spherical cap also having the radius R3.

A central hub 158 is axially offset from the contour of the body 150 along the axis of rotation 130. The hub 158 can be integrally formed as one piece with the body 150 or alternatively coupled thereto. The hub 158 is generally continuous from the body 150 and transitions through an arcuate or rounded section 170 to a cylindrical wall 180 that itself transitions to an arcuate or curvilinear wall 182 presenting an abutment face 184 via an arcuate or rounded wall section 190. The wall 182 as illustrated has a diameter D4 and a non-infinite (i.e., non-flat) radial concavity having a radius R4 measured from a point on the axis 130, which is also constant about the axis of rotation 130 (it is to be understood that R3 and R4 are to be identified as radii associated with the respective concavities of the aforementioned components as illustrated). The offset of the hub 158 can be described in terms of the height H of the wall 180, which is some implementations may be zero. Due to the height H, the hub 158 conversely defines a recess 204 on the opposing side of the body 150 with a convex abutment face 208 opposing the abutment face 184. An aperture 192 extends through the wall 184 and is aligned with the axis of rotation 130.

In the illustrated implementation, the concavity of the body 150 is different from the concavity of the wall 184, and therefore the radius R3 is different from radius R4. In particular and as illustrated, the concavity of the body 150 is not as great as the concavity of the wall 184 and therefore radius R4 is smaller than radius R3. In additional or alternative implementations, R4 could be larger than R3, or R4 and R3 could have the same value. The radius R3 may range between 20 inches and 50 inches, while the radius R4 may range between 10 inches and 40 inches. In some implementations, the minimum difference between radius R3 and radius R4 is 2 inches.

With respect to FIGS. 5-8, the disk 126 is part of a disk assembly 220 that also includes a first spool 128 and a second spool 128. The first and second spools 128 have substantially the same configuration, as discussed in greater detail below. The first spool 128 is positionable adjacent and against the abutment face 184 and includes a bore 214 that aligns with the aperture 192 and is configured to receive a gang bolt (not shown). Similarly, the second spool 128 is positionable adjacent and against the face 208 (and partially within the recess 204) and includes a bore 214 that aligns with the aperture 192. The disk 126, the first spool 128, and the second spool 128 are configured to be positioned along a gang bolt (not shown) that extends along the axis of rotation 130. Bearings and associated components (not shown) complete a gang assembly.

Further with respect to FIGS. 5-8, each of the first and second spools 128, 128 includes a first end 230 that is complementary in contour and shape to the abutment face 184 and a second end 234 that is complementary in contour and shape to the abutment face 208. Accordingly, in the illustrated implementation, the first end 230 of each of the first spool 128 and the second spool 128 is convex and the second end 234 of each of the first spool 128 and the second spool 128 is concave, wherein the respective convexity and concavity can be described as having a radius from a point on the axis of rotation of the respective spool 128. The geometry of the respective faces 184, 208 relative to the associated ends 230, 234 of the first and the second spools 128, 128 allows for greater contact stress area between the structure of the hub 158 and the first and the second spools 128, 128. Disk retention under load is therefore improved in comparison to the disks 26a, 26b, discussed above.

One method of use includes removing one or more disks 126 of a disk gang and replacing with one or more replacement disks 126. In particular, a method of replacing a disk 126 of a disk assembly 134 of a tillage machine 10 includes removing one of the first and second spools 128, 128, removing a first disk 126 having radii R3, R4 from the gang 18, and replacing with a second disk 126 having radii R3, R4, where R3 of the second disk is different than R3 of the first disk, and thereafter reassembling the disk assembly 134 with the same spools 128, 128. In this manner, the disks of a gang can be replaced with disks of a different concavity or contour while reusing the same spools.

Figure 9:
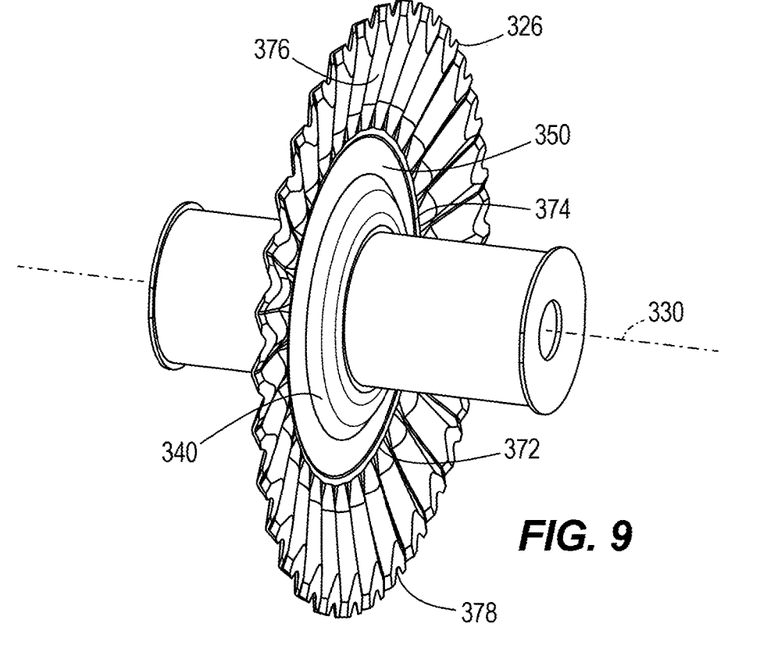
FIG. 9 is a perspective view of a disk according to another implementation.

The disk 126 may have additional suitable configurations and features. For example, the disk 326 of FIG. 9 may include features similar to the disk 126 but with a wall 340 not cylindrical but having a gradual slope to the disk body 350, i.e., partially frustoconical, wherein the body 350 forms a first section 372 with a concavity having a first radius (measured from an axis 330) to a first circumference 374, after which the remainder of the body 350 presents continuous undulations, ribs, axial offsets, or a similar structure 376 about the axis 330 to a disk edge 378. In some implementations, the undulations or ribs 376 may have a continuous concavity matching that of first section 372 or may have a different concavity (and associated radius as previously defined) than that of the first section 372. In other implementations, the first section 372 may be continuous or smooth (or planar) all the way to the disk edge 378 without undulations or ribs or any such contour.

Figure 10:
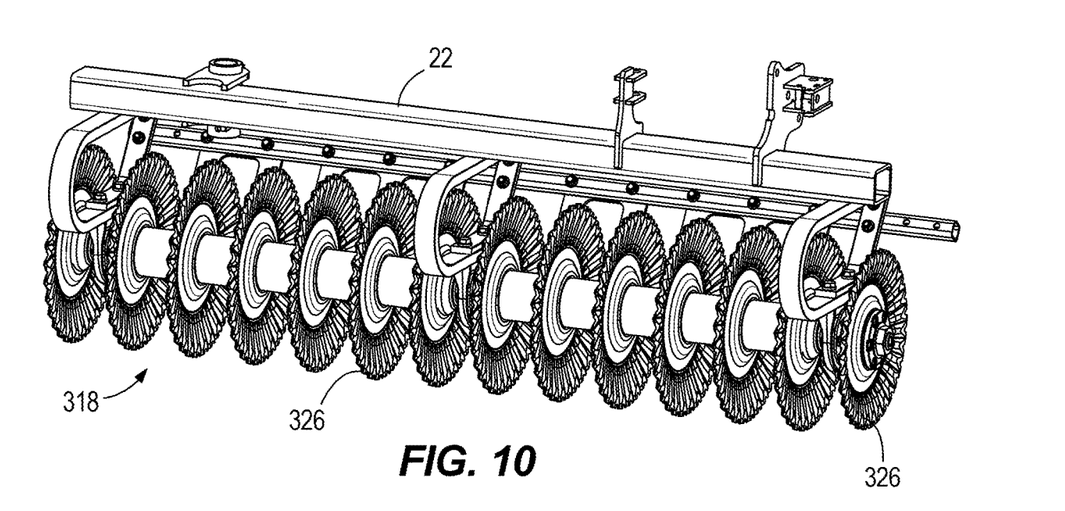
FIG. 10 is a perspective view of a portion of a tillage machine including a plurality of the tillage disks of FIG. 9.

FIG. 10 illustrates a plurality of disks 326 configured in a gang 318 with a support element 22.

In still other implementations, a disk body such as disk body 150 may have a variable concavity from the hub portion 158 to the edge or circumference of the disk with a discrete number of radii changes or with a continuously changing radius (the radius measured from a point on the axis 130 as illustrated and previously described), with or without all or any of the aforementioned disk features, or the disk body from the hub portion to the edge may be generally planar. In some implementations, the abutment face 184 may be convex and the abutment face 208 may be concave. In yet other implementations, the aforementioned concavity of the disk body 150 may be "reversed," i.e., convex with respect to the 'hub' side of the disk and concave with respect to the 'recess' side of the disk.

Figure 11A:
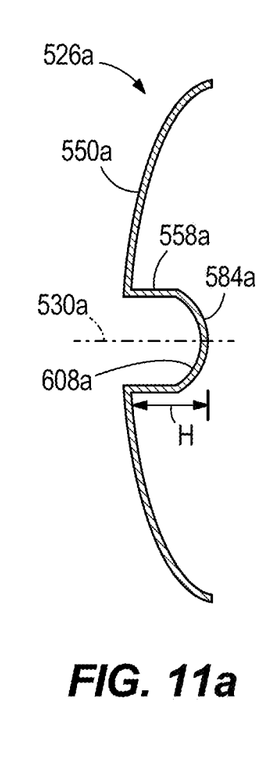
FIG. 11a is a cross-sectional view of a disk according to another implementation.
Figure 11B:
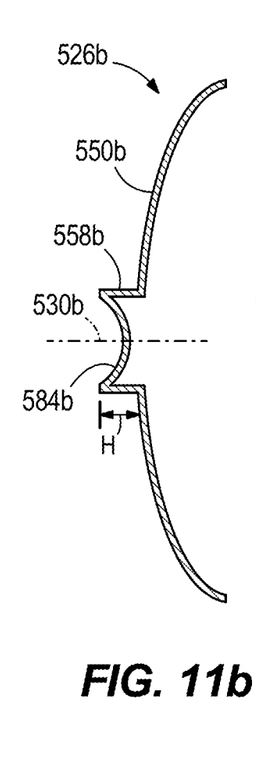
FIG. 11b is a cross-sectional view of a disk according to another implementation.
Figure 11C:
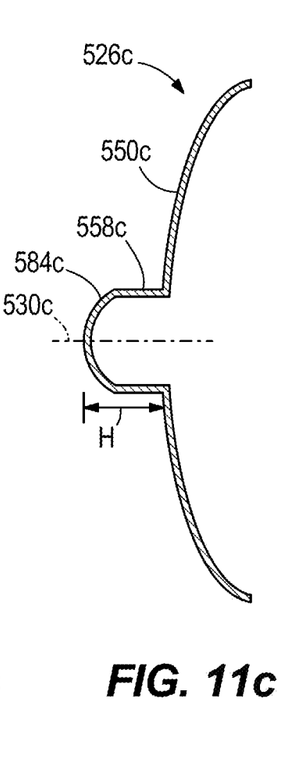
FIG. 11c is a cross-sectional view of a disk according to another implementation.
Figure 11D:
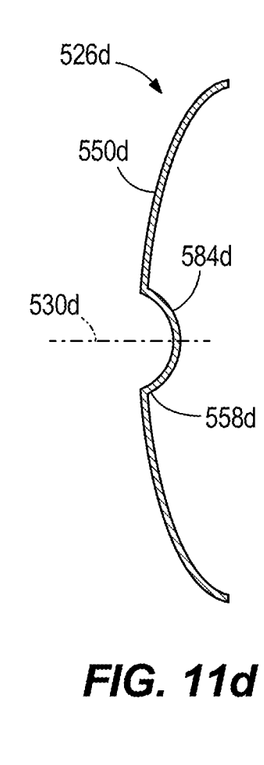
FIG. 11d is a cross-sectional view of a disk according to another implementation.
Figure 11E:
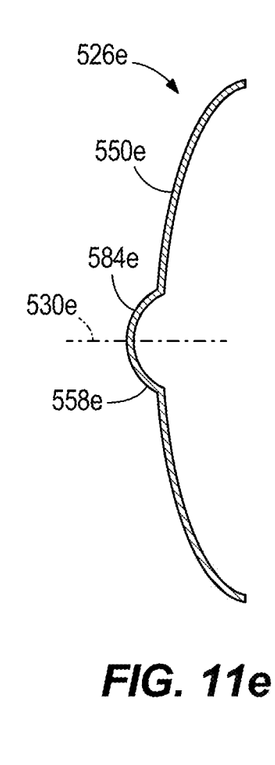
FIG. 11e is a cross-sectional view of a disk according to another implementation.

Exemplary implementations are illustrated in FIGS. 11a-11e. FIG. 11a illustrates a disk 526a that is rotatable about an axis 530a and that includes a body 550a and a hub 558a. The hub 558a of FIG. 11a has an abutment face 584a that is convex and another abutment face 608a this is concave. FIGS. 11b and 11c illustrate disks 526b, 526c having the above-referenced "reversed" configuration. That is, the disks 526b, 526c include disk bodies 550b, 550c that are convex with respect to the 'hub' side of the disk and concave with respect to the 'recess' side of the disk. As shown, the hubs 558b, 558c can have abutment faces 584b, 584c that are concave (FIG. 11b) or convex (FIG. 11c) relative to the body 550b, 550c. FIGS. 11d and 11e illustrate disks 526d, 526e in which H is zero. In other words, the hubs 558d, 558e are continuous with the bodies 550d, 550e, respectively. As shown, the hubs 558d, 558e can have abutment faces 584d, 584e that are convex (FIG. 11d) or concave (FIG. 11e) relative to the body 550d, 550e. The implementations of FIGS. 11a-11e are exemplary. It is contemplated that the disks may have other suitable configurations.

The disks 126, 326, 526 of FIGS. 3-11e, can be one disk of a first set of disks for a gang assembly in which each disk has the same hub configuration (i.e., having arcuate walls or abutment faces with substantially the same concavity) and the same body configuration (i.e., having the same body concavities and/or surface configurations including any and all previously described or illustrated). In turn, a second set of disks may include disks each having the same hub configuration as the disks of the first set of disks but different body configurations than those of the first set. Because the hub configuration of each disk across the first and second sets of disks is the same, the same spools can be used with each disk across the first and second sets of disks. Accordingly, all of the disks of both the first and second sets of disks are usable with the same set of spools.

Various features of the disclosure are set forth in the following claims.

What is claimed is:

1. A disk for use with a spool, the disk and the spool being usable with a tillage machine, the disk comprising:
    a body portion rotatable about an axis of rotation, the body portion having a circumferential edge and a concavity with a first radius defined from a point on the axis of rotation;
    a hub portion continuous with the body portion and presenting an abutment face having a concavity with a second radius defined from a point on the axis of rotation, the second radius being different than the first radius; and
    an aperture extending through the abutment face and centered about the axis of rotations,
    wherein the abutment face is configured to be complementary in contour and in shape to a mating surface of the spool, and
    wherein the first radius is constant about the axis of rotation.

2. The disk of claim 1, wherein the abutment face is axially offset along the axis of rotation from the body portion.

3. The disk of claim 1, wherein the first radius is constant from the hub portion to the circumferential edge.

4. The disk of claim 1, wherein the first radius is greater than the second radius.

5. The disk of claim 1, wherein the second radius is greater than the first radius.

6. The disk of claim 1, wherein the body portion includes undulations adjacent the circumferential edge.

7. The disk of claim 1, wherein the second radius ranges between 10 inches and 40 inches.

8. A disk for use with a spool, the disk and the spool being usable with a tillage machine, the disk comprising:
    a body portion rotatable about an axis of rotation, the body portion having a circumferential edge and a concavity with a first radius defined from a point on the axis of rotation;
    a hub portion continuous with the body portion and presenting an abutment face having a concavity with a second radius defined from a point on the axis of rotation, the second radius being different than the first radius; and
    an aperture extending through the abutment face and centered about the axis of rotations,
    wherein the abutment face is configured to be complementary in contour and in shape to a mating surface of the spool,
    wherein the first radius is constant from the hub portion to the circumferential edge.

9. A disk assembly for use with a tillage machine, the disk assembly comprising:
    a disk including
        a body portion rotatable about an axis of rotation, the body portion having a circumferential edge and a concavity with a first radius defined from a point on the axis of rotation,
        a hub portion continuous with the body portion and presenting a first abutment face having a concavity with a second radius defined from a point on the axis of rotation and a second abutment face opposing the first abutment face, and
        an aperture extending through the first and second abutment faces and centered about the axis of rotation;
    a first spool positionable against the first abutment face, the first spool including a bore alignable with the aperture along the axis of rotation; and
    a second spool positionable against the second abutment face, the second spool including a bore alignable with the aperture along the axis of rotation,
    wherein the disk, the first spool, and the second spool are configured to be positioned along a gang bolt that extends along the axis of rotation, and
    wherein the first and the second spools each include a first end that is complementary to the first abutment face and a second end that is complementary to the second abutment face,
    wherein the first radius is constant about the axis of rotation.

10. The disk assembly of claim 9, wherein the first and second spools are interchangeable.

11. The disk of claim 9, wherein the first radius is greater than the second radius.

12. The disk of claim 9, wherein the second radius is greater than the first radius.

13. The disk of claim 9, wherein the second radius ranges between 10 inches and 40 inches.

14. The disk assembly of claim 9, wherein the first end of each of the first spool and the second spool forms a convex surface and the second end of each of the first spool and the second spool forms a concave surface.

15. A disk assembly for use with a tillage machine, the disk assembly comprising:
- a disk including
  - a body portion rotatable about an axis of rotation, the body portion having a circumferential edge and a concavity with a first radius defined from a point on the axis of rotation,
  - a hub portion continuous with the body portion and presenting a first abutment face having a concavity with a second radius defined from a point on the axis of rotation and a second abutment face opposing the first abutment face, and
  - an aperture extending through the first and second abutment faces and centered about the axis of rotation;
- a first spool positionable against the first abutment face, the first spool including a bore alignable with the aperture along the axis of rotation; and
- a second spool positionable against the second abutment face, the second spool including a bore alignable with the aperture along the axis of rotation,
- wherein the disk, the first spool, and the second spool are configured to be positioned along a gang bolt that extends along the axis of rotation, and
- wherein the first and the second spools each include a first end that is complementary to the first abutment face and a second end that is complementary to the second abutment face,
- wherein the first radius is constant from the hub portion to the circumferential edge.

* * * * *

UNITED STATES PATENT AND TRADEMARK OFFICE
CERTIFICATE OF CORRECTION

PATENT NO. : 10,842,063 B2  
APPLICATION NO. : 15/891134  
DATED : November 24, 2020  
INVENTOR(S) : Luc Janelle et al.

Page 1 of 1

It is certified that error appears in the above-identified patent and that said Letters Patent is hereby corrected as shown below:

In the Claims

At Column 5, Line 57 in Claim 1:
"centered about the axis of rotations" should read --centered about the axis of rotation--

At Column 6, Line 22 in Claim 8:
"centered about the axis of rotations" should read --centered about the axis of rotation--

At Column 6, Line 60 in Claim 11:
"The disk of claim 9," should read --The disk assembly of claim 9,--

At Column 6, Line 62 in Claim 12:
"The disk of claim 9," should read --The disk assembly of claim 9,--

At Column 6, Line 64 in Claim 13:
"The disk of claim 9," should read --The disk assembly of claim 9,--

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*